(12) United States Patent
Baca

(10) Patent No.: US 9,939,089 B2
(45) Date of Patent: Apr. 10, 2018

(54) BI-DIRECTIONAL SEAL ASSEMBLY

(71) Applicant: FMC Technologies, Inc., Houston, TX (US)

(72) Inventor: Brian J. Baca, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 14/838,249

(22) Filed: Aug. 27, 2015

(65) Prior Publication Data

US 2015/0369404 A1 Dec. 24, 2015

Related U.S. Application Data

(63) Continuation of application No. 12/661,712, filed on Mar. 22, 2010, now Pat. No. 9,140,388.

(51) Int. Cl.
| | |
|---|---|
| *F16L 21/02* | (2006.01) |
| *F16J 15/02* | (2006.01) |
| *F16J 15/3236* | (2016.01) |
| *F16L 7/02* | (2006.01) |
| *E21B 33/04* | (2006.01) |
| *F16J 15/06* | (2006.01) |
| *E21B 33/00* | (2006.01) |

(52) U.S. Cl.
CPC ............ *F16L 21/02* (2013.01); *E21B 33/04* (2013.01); *F16J 15/025* (2013.01); *F16J 15/061* (2013.01); *F16J 15/062* (2013.01); *F16J 15/3236* (2013.01); *F16L 7/02* (2013.01); *E21B 2033/005* (2013.01)

(58) Field of Classification Search
CPC ...... F16J 15/025; F16J 15/3236; F16J 15/061; F16J 15/062; F16L 7/02; F16L 21/02; E21B 2033/005; E21B 33/04
See application file for complete search history.

(56) References Cited

U.S. PATENT DOCUMENTS

| | | | | |
|---|---|---|---|---|
| 2,075,947 A | * | 4/1937 | Kennedy | F16L 19/065 277/622 |
| 2,898,000 A | * | 8/1959 | Hanny | F16J 15/0887 277/649 |
| 3,903,584 A | * | 9/1975 | Evans | B23P 13/00 29/450 |

(Continued)

*Primary Examiner* — Eugene G Byrd
(74) *Attorney, Agent, or Firm* — Henry C. Query, Jr.

(57) ABSTRACT

A bi-directional seal assembly for sealing the annulus between an inner tubular member and an outer tubular member comprises an annular seal which in cross section includes a generally U-shaped first portion having a radially inner first leg and a radially outer second leg and a generally U-shaped second portion having a radially inner third leg and a radially outer fourth leg. The second and third legs are joined together such that the first leg engages the inner tubular member and the fourth leg engages the outer tubular member. Pressure below the seal urges the first leg into sealing engagement with the inner tubular member and forces the second and third legs radially outwardly to thereby urge the fourth leg into sealing engagement with the outer tubular member. Also, pressure above the seal urges the fourth leg into sealing engagement with the outer tubular member and forces the second and third legs radially inwardly to thereby urge the first leg into sealing engagement with the inner tubular member.

20 Claims, 6 Drawing Sheets

(56) References Cited

U.S. PATENT DOCUMENTS

| | | | | |
|---|---|---|---|---|
| 3,915,462 A * | 10/1975 | Bruns | F16J 15/0887 | 277/647 |
| 4,125,929 A * | 11/1978 | Rode | B23P 15/00 | 29/446 |
| 4,131,287 A * | 12/1978 | Gunderson | E21B 33/04 | 277/328 |
| 4,410,189 A * | 10/1983 | Myers | F16J 15/3236 | 277/530 |
| 4,452,462 A * | 6/1984 | Karr, Jr. | F16J 15/0887 | 277/614 |
| 4,488,740 A * | 12/1984 | Baugh | E21B 33/043 | 285/106 |
| 4,615,544 A * | 10/1986 | Baugh | E21B 33/043 | 166/348 |
| 4,813,692 A * | 3/1989 | Halling | F16J 15/021 | 277/626 |
| 4,854,600 A * | 8/1989 | Halling | F16J 15/021 | 277/626 |
| 5,110,144 A * | 5/1992 | Burton | E21B 33/04 | 166/115 |
| 5,435,576 A * | 7/1995 | Rode | F16J 15/0887 | 277/362 |
| 5,456,314 A * | 10/1995 | Boehm, Jr. | E21B 33/04 | 166/208 |
| 5,542,475 A * | 8/1996 | Turner | E21B 23/02 | 166/115 |
| 5,669,612 A * | 9/1997 | Nicholson | F16J 15/0887 | 277/614 |
| 5,735,344 A * | 4/1998 | Duncan | E21B 33/04 | 166/115 |
| 5,799,954 A * | 9/1998 | Layer | F16J 15/0887 | 277/614 |
| 5,997,003 A * | 12/1999 | Turner | E21B 33/04 | 277/335 |
| 6,286,839 B1 * | 9/2001 | Mitsui | F16J 15/128 | 277/603 |
| 6,302,402 B1 * | 10/2001 | Rynders | F16J 15/0806 | 277/530 |
| 6,352,267 B1 * | 3/2002 | Rode | F16J 15/0887 | 277/631 |
| 6,505,838 B1 * | 1/2003 | Cavaliere | G05D 16/10 | 277/436 |
| 6,530,574 B1 * | 3/2003 | Bailey | E21B 33/1208 | 166/179 |
| 6,588,761 B2 * | 7/2003 | Halling | F16L 23/16 | 277/312 |
| 6,626,440 B2 * | 9/2003 | Halling | F16J 15/0887 | 277/626 |
| 6,869,079 B2 * | 3/2005 | Zheng | F16J 15/28 | 277/342 |
| 6,942,220 B2 * | 9/2005 | Takahiro | F16J 15/0887 | 277/603 |
| 6,997,677 B2 * | 2/2006 | Munshi | F01D 11/005 | 277/642 |
| 7,428,912 B2 * | 9/2008 | Pozzati | F16J 15/3212 | 137/375 |
| 2007/0102888 A1 * | 5/2007 | Takahiro | F16J 15/0887 | 277/603 |
| 2008/0265517 A1 * | 10/2008 | Jennings | E21B 33/04 | 166/84.1 |
| 2009/0133884 A1 * | 5/2009 | Fenton | E21B 33/04 | 166/387 |
| 2009/0155671 A1 * | 6/2009 | Reytier | C25B 1/10 | 429/483 |

* cited by examiner

BI-DIRECTIONAL SEAL ASSEMBLY

This application is a continuation of U.S. patent application Ser. No. 12/661,712 filed on Mar. 22, 2010.

BACKGROUND OF THE INVENTION

The present invention is directed to a bi-directional seal assembly for sealing the annulus between an inner tubular member and an outer tubular member. In particular, the invention is directed to a seal assembly which includes an annular metal seal that in cross section comprises two generally U-shaped portions which enable the seal to be pressure energized from both above and below the seal assembly. The seal can be installed as an interference fit between the tubular members or mechanically energized into sealing engagement with the tubular members after it is installed.

Packoffs are commonly used in hydrocarbon production wells to seal the annulus between a wellhead and, e.g., a casing hanger which is landed in the wellhead. These prior art packoffs often include one or more metal seals which are supported on a packoff body that is locked in place between the casing hanger and the wellhead. Either during or after installation of the packoff, the seals are either mechanically or pressure energized into sealing engagement with both the wellhead and the casing hanger.

Many prior art packoffs have only one metal seal and are uni-directional, that is, they are designed to seal in only one direction. This poses difficulties when it is desired to pressure test the packoff from a port external to the wellhead. Some packoffs include elastomer seals for purposes of pressure testing. However, over time the elastomer can fail and the ability to test the packoff is consequently lost.

Therefore, a need exists for a packoff seal which is bi-directional, that is, which is capable of sealing from both above and below. In addition, a need exists for a bi-directional packoff seal whose pressure reliability in both directions can be proved by pressure testing the packoff from only one direction.

SUMMARY OF THE INVENTION

In accordance with the present invention, a bi-directional seal assembly is provided for sealing between an inner tubular member and an outer tubular member. The seal assembly comprises an annular seal which is positioned in the annulus and which in cross section includes a generally U-shaped first portion which comprises a radially inner first leg and a radially outer second leg, the first and second legs defining a first cavity; and a generally U-shaped second portion which comprises a radially inner third leg and a radially outer fourth leg, the third and fourth legs defining a second cavity. The second and third legs are joined together between the first and fourth legs. Also, the first leg engages the inner tubular member and the fourth leg engages the outer tubular member to thereby sealingly divide the annulus into first and second parts.

In accordance with one embodiment of the invention, the second and third legs are joined together such that the first cavity faces the first part of the annulus and the second cavity faces the second part of the annulus. In this embodiment, the seal assembly may also comprise a first support ring which is positioned in the first cavity and a second support ring which is positioned in the second cavity. The first support ring causes the first leg to remain engaged with the inner tubular member under the influence of pressure in the second part of the annulus and the second support ring causes the fourth leg to remain engaged with the outer tubular member under the influence of pressure in the first part of the annulus. Also, pressure in the first part of the annulus urges the first leg into sealing engagement with the inner tubular member and forces the second leg radially outwardly to thereby urge the fourth leg into sealing engagement with the outer tubular member. In addition, pressure in the second part of the annulus urges the fourth leg into sealing engagement with the outer tubular member and forces the third leg radially inwardly to thereby urge the first leg into sealing engagement with the inner tubular member.

In accordance with another embodiment of the invention, when the seal is in a relaxed condition the first support ring forms an interference fit with the first cavity such that, when the first support ring is inserted into the first cavity, the first support ring will urge the first leg into sealing engagement with the inner tubular member. In addition, when the seal is in relaxed condition the second support ring forms an interference fit with the second cavity such that, when the second support ring is inserted into the second cavity, the second support ring will urge the fourth leg into sealing engagement with the outer tubular member.

In accordance with yet another embodiment of the invention, the second and third legs are joined together such that both the first and second cavities face the first part of the annulus and the second and third legs define a third cavity which faces the second part of the annulus. In this embodiment, the seal assembly may also comprise a first support ring which is positioned in the first cavity and a second support ring which is positioned in the second cavity. The first support ring causes the first leg to remain engaged with the inner tubular member under the influence of pressure in the second part of the annulus and the second support ring causes the fourth leg to remain engaged with the outer tubular member under the influence of pressure in the second part of the annulus. Also, pressure in the second part of the annulus forces the second leg radially inwardly to thereby urge the first leg into sealing engagement with the inner tubular member and forces the third leg radially outwardly to thereby urge the fourth leg into sealing engagement with the outer tubular member.

In accordance with yet another embodiment of the invention, the seal assembly further comprises a third support ring which is positioned in the third cavity. The third support ring causes the first and fourth legs to remain engaged with the inner and outer tubular members, respectively, under the influence of pressure in the first part of the annulus.

In accordance with a further embodiment of the invention, when the seal is in a relaxed condition the third support ring forms an interference fit with the third cavity such that, when the third support ring is inserted into the third cavity, the third support ring will force the second and third legs toward the inner and outer tubular members, respectively, to thereby urge the first and fourth legs into sealing engagement with the inner and outer tubular members, respectively.

The present invention is also directed to a packoff which is positioned in an annulus between a wellhead and a tubular hanger which is landed in the wellhead. The packoff comprises an upper packoff body; a first seal which is positioned below the upper packoff body; and a lower packoff body which is positioned below the first seal and which is supported on one of the tubular hanger or the wellhead. In cross section, the first seal includes a generally U-shaped first portion which comprises a radially inner first leg and a radially outer second leg, the first and second legs defining a first cavity; and a generally U-shaped second portion which comprises a radially inner third leg and a radially outer fourth leg, the third and fourth legs defining a second cavity. The second and third legs are joined together between the first and fourth legs. Also, the first leg engages the tubular hanger and the fourth leg engages the wellhead to thereby sealingly divide the annulus into a first part located above the first seal and a second part located below the first seal.

In accordance with another embodiment of the packoff of the present invention, the second and third legs are joined together such that the first cavity faces the first part of the annulus and the second cavity faces the second part of the annulus. In addition, the packoff may comprise a first support ring which is positioned in the first cavity and a second support ring which is positioned in the second cavity. The first support ring causes the first leg to remain engaged with the tubular hanger under the influence of pressure in the second part of the annulus and the second support ring causes the fourth leg to remain engaged with the wellhead under the influence of pressure in the first part of the annulus. Also, pressure in the first part of the annulus urges the first leg into sealing engagement with the tubular hanger and forces the second leg radially outwardly to thereby urge the fourth leg into sealing engagement with the wellhead. In addition, pressure in the second part of the annulus urges the fourth leg into sealing engagement with the wellhead and forces the third leg radially inwardly to thereby urge the first leg into sealing engagement with the tubular hanger.

In accordance with yet another embodiment of the packoff of the present invention, when the first seal is in a relaxed condition the first support ring forms an interference fit with the first cavity such that, when the first support ring is inserted into the first cavity, the first support ring will urge the first leg into sealing engagement with the tubular hanger. In addition, when the first seal is in a relaxed condition the second support ring forms an interference fit with the second cavity such that, when the second support ring is inserted into the second cavity, the second support ring will urge the fourth leg into sealing engagement with the wellhead.

In accordance with still another embodiment of the packoff of the present invention, the packoff also comprises a second seal which is positioned between the first seal and the lower packoff body and which in cross section comprises a generally U-shaped third portion which comprises a radially inner fifth leg and a radially outer sixth leg, the fifth and sixth legs defining a third cavity; and a generally U-shaped fourth portion which comprises a radially inner seventh leg and a radially outer eighth leg, the seventh and eighth legs defining a fourth cavity. The sixth and seventh legs are joined together between the fifth and eighth legs. Also, the fifth leg engages the tubular hanger and the eighth leg engages the wellhead to thereby seal the annulus.

Thus, the present invention provides a bi-directional seal assembly which effectively seals from both above and below. Consequently, additional seals do not need to be employed in conjunction with the seal assembly. In addition, pressure testing of the seal assembly from one direction will establish that the seal assembly is cable of effectively sealing from both directions.

These and other objects and advantages of the present invention will be made apparent from the following detailed description, with reference to the accompanying drawings. In the drawings, the same reference numbers may be used to denote similar components in the various embodiments.

DETAILED DESCRIPTION OF THE INVENTION

Figure 1:
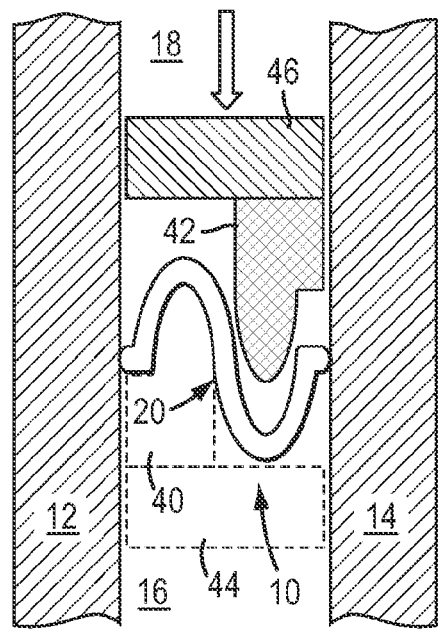
FIG. 1 is a cross sectional representation of one embodiment of the seal assembly of the present invention showing the seal component of the invention prior to being energized by an exemplary support ring.
Figure 2:
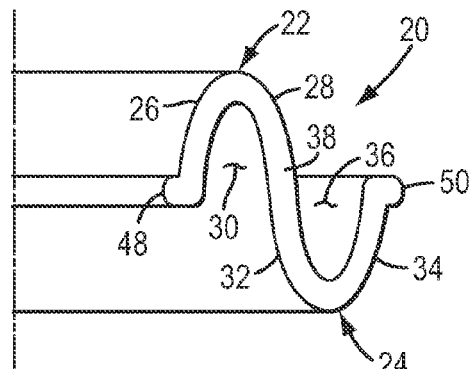
FIG. 2 is a cross sectional representation of the seal component shown in FIG. 1.

Referring to FIGS. 1 and 2, one embodiment of the seal assembly of the present invention, which is indicated generally by reference number 10, is shown positioned in the annulus between an inner tubular member 12 and an outer tubular member 14. The inner and outer tubular members 12, 14 may comprise any type of fluid handling pipes or conduits. When engaged between the inner and outer tubular members 12, 14, the seal assembly 10 sealingly divides the annulus into a first part 16 located below the seal assembly and a second part 18 located above the seal assembly.

The seal assembly 10 includes an annular metal seal 20 which in cross section includes a radially inner, generally U-shaped first portion 22 and a radially outer, generally U-shaped second portion 24. The first portion 22 comprises a radially inner first leg 26 and a radially outer second leg 28 which together define a first cavity 30. Similarly, the second portion 24 comprises a radially inner third leg 32 and a radially outer fourth leg 34 which together define a second cavity 36. When positioned in the annulus, the first leg 26 engages the inner tubular member 12 and the fourth leg 34 engages the outer tubular member 14. The seal 20 may be installed as an interference fit between the inner and outer tubular members 12, 14 or mechanically energized into engagement with the inner and outer tubular members by a separate member.

In the embodiment of the invention shown in FIGS. 1 and 2, the first and second portions 22, 24 are oriented in opposite directions and the second and third legs 28, 32 are joined together at a point 38 which is located radially between the first and fourth legs 26, 34. In this orientation, the first cavity 30 faces the first part 16 of the annulus and the second cavity 36 faces the second part 18 of the annulus.

Figure 3:
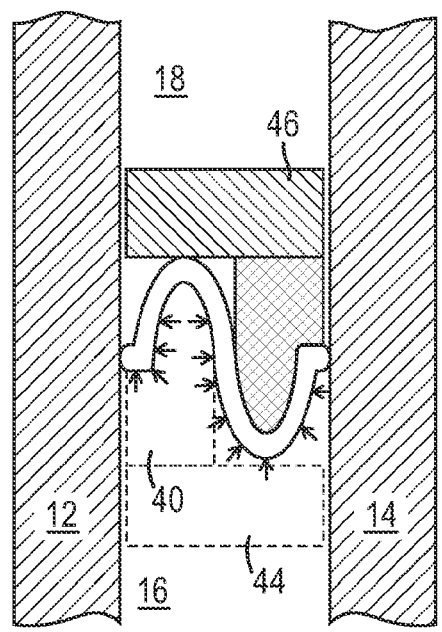
FIG. 3 is a cross sectional representation of the seal assembly of FIG. 1 showing the seal component after being energized by the support ring.

Referring also to FIG. 3, the seal assembly 10 may also comprise first and second support rings 40, 42 to help support the seal 20 within the annulus and to facilitate either the mechanical or pressure energization of the first and fourth legs 26, 34. In the embodiment of the invention shown in FIGS. 1 and 3, for example, the first and second support rings 40, 42 are used to mechanically energize the first and fourth legs 26, 34 into sealing engagement with the inner and outer tubular members 12, 14. In these figures, the first support ring 40 is shown in phantom for purposes of clarity.

For the purpose of mechanically energizing the first and fourth legs 26, 34, the first support ring 40 and preferably also the seal 20 are supported on a seat ring 44 which in turn is supported on one of the inner or outer tubular members 12, 14. Also, each support ring 40, 42 ideally comprises a cross section which is configured to form an interference fit with its corresponding cavity 30, 36 when the seal 20 is in its relaxed or un-energized state. Thus, when the second support ring 42 is forced down against the seal 20 by, e.g., an energizing mandrel 46, the first support ring 40 will enter the first cavity 30 and force the first leg 26 radially inwardly into sealing engagement with the inner tubular member 12, and the second support ring 42 will enter the second cavity 36 and force the fourth leg 34 radially outwardly into sealing engagement with the outer tubular member 14.

In an alternative embodiment of the invention, the first and fourth legs 26, 34 are pressure-energized into sealing engagement with the inner and outer tubular members 12, 14. In this embodiment, pressure in the first part 16 of the annulus, which is represented by the many small arrows in FIG. 3, will urge the first leg 26 into sealing engagement with the inner tubular member 12 and force the second and third legs 28, 32 radially outwardly to thereby urge the fourth leg 34 into sealing engagement with the outer tubular member 14. Similarly, pressure in the second part 18 of the annulus will urge the fourth leg 34 into sealing engagement with the outer tubular member 14 and bias the second and third legs 28, 32 radially inwardly to thereby urge the first leg 26 into sealing engagement with the inner tubular member.

Although not required, the first and second support rings 40, 42 may be used to facilitate the pressure energization of the first and fourth legs 26, 34. As shown in FIG. 3, pressure in the first part 16 of the annulus, which is represented by the many small arrows, pushes radially inwardly on the fourth leg 34. However, because the second support ring 42 occupies the second cavity 36, the forces resulting from the pressure acting on the third and fourth legs 32, 34 cancel each other out. Consequently, the only force acting on the fourth leg 34 results from the pressure acting on the second leg, and this force acts radially outwardly to urge the fourth leg into sealing engagement with the outer tubular member 14. The first support ring 40 plays a similar role in urging the first leg 26 into sealing engagement with the inner tubular member 12 under the influence of pressure in the second part 18 of the annulus. In this embodiment, the support rings 40, 42 need not form an interference fit with their respective cavities 30, 36.

Referring again to FIG. 2, the seal 20 may also comprise an inner sealing bump 48 which is formed on the distal end of the first leg 26 and an outer bump 50 which is formed on the distal end of the fourth leg 34. The bumps 48, 50 serve to concentrate the sealing forces of the first and fourth legs 26, 34 against the inner and outer tubular members 12, 14, which provides for a more effective seal between the seal 20 and these members.

Figure 4:
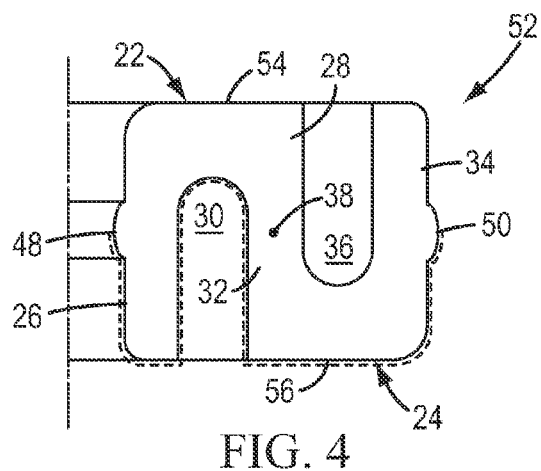
FIG. 4 is a cross sectional representation of a second embodiment of the seal assembly of the present invention.

Referring to FIG. 4, another embodiment of the seal assembly of the present invention comprises an annular seal, generally 52, which in cross section includes a radially inner, generally U-shaped first portion 22 and a radially outer, generally U-shaped second portion 24. The first portion 22 comprises a radially inner first leg 26 and a radially outer second leg 28 which together define a first cavity 30. Similarly, the second portion 24 comprises a radially inner third leg 32 and a radially outer fourth leg 34 which together define a second cavity 36. The first and second portions 22, 24 are oriented in opposite directions and the second and third legs 28, 32 are joined together at a point 38 which is located radially between the first and fourth legs 26, 34.

In this embodiment, the first portion 22 comprises a generally flat first apex 54 which extends radially between approximately the inner edge of the first leg 26 and the outer edge of the second leg 28. Likewise, the second portion 24 comprises a generally flat second apex 56 which extends radially between approximately the inner edge of the third leg 32 and the outer edge of the fourth leg 34. The first and fourth legs 26, 34 are oriented generally axially, and the distal end of the first leg is generally aligned with the second apex 56 while the distal end of the fourth leg is generally aligned with the first apex 54.

The seal 52 may be installed as an interference fit between the inner and outer tubular members and does not require support rings to aid in its mechanical or pressure energization. In addition, the seal 52 may comprise an inner sealing bump 48 which is formed on the first leg 26 and an outer sealing bump 50 which is formed on the fourth leg 34.

Figure 5:
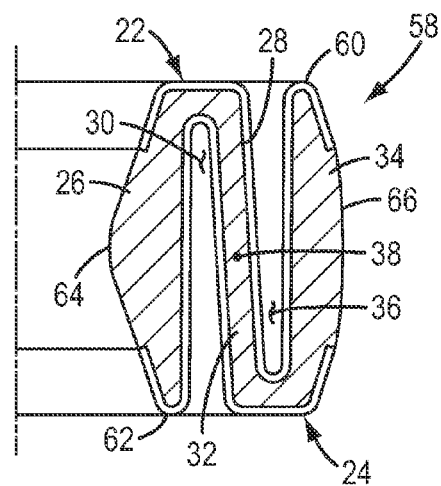
FIG. 5 is a cross sectional representation of a third embodiment of the seal assembly of the present invention.

A further embodiment of the seal assembly of the present invention is shown in FIG. 5. The seal assembly of this embodiment is comprised of an non-metallic seal, generally 58, which is positioned between upper and lower endcaps 60, 62 that are made of a material which is more rigid than the seal material. As in the previous embodiments, the seal 58 includes a radially inner, generally U-shaped first portion 22 and a radially outer, generally U-shaped second portion 24. The first portion 22 comprises a radially inner first leg 26 and a radially outer second leg 28 which together define a first cavity 30. Similarly, the second portion 24 comprises a radially inner third leg 32 and a radially outer fourth leg 34 which together define a second cavity 36. The first and second portions 22, 24 are oriented in opposite directions and the second and third legs 28, 32 are joined together at a point 38 which is located radially between the first and fourth legs 26, 34.

The upper and lower endcaps 60, 62 are configured to conform to the shape of the seal 58. In addition, the first leg 26 comprises a radially inner sealing face 64 which is located between the radially inner ends of the upper and lower endcaps, and the fourth leg 34 comprises a radially outer sealing face 66 which is located between the radially outer ends of the upper and lower endcaps. As with the seal 52, the seal 58 may be installed as an interference fit between the inner and outer tubular members and does not require support rings to aid in its mechanical or pressure energization.

Figure 6:
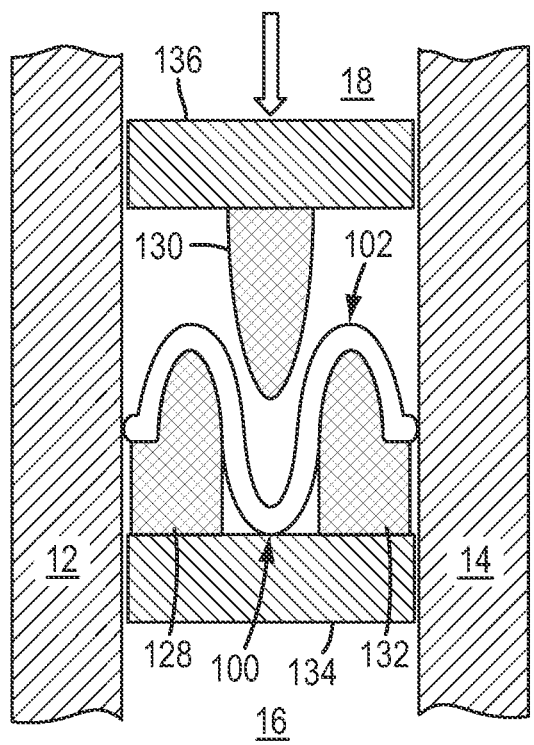
FIG. 6 is a cross sectional representation of a fourth embodiment of the seal assembly of the present invention showing the seal component of the invention prior to being energized by another exemplary support ring.
Figure 7:
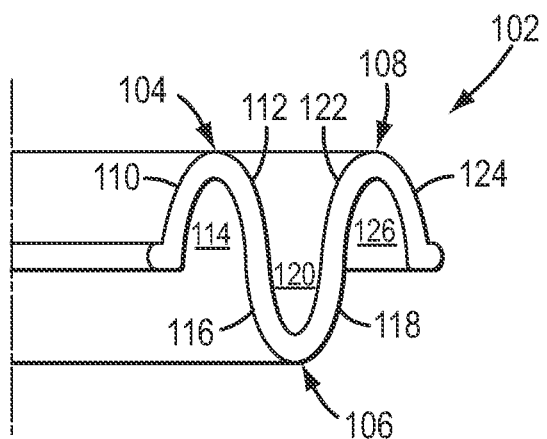
FIG. 7 is a cross sectional representation of the seal component shown in FIG. 6.

Another embodiment of the seal assembly of the present invention is shown in FIGS. 6 and 7. The seal assembly of this embodiment, generally 100, comprises an annular seal 102 which in cross section includes a radially inner, generally U-shaped first portion 104, a radially intermediate, generally U-shaped second portion 106 and a radially outer, generally U-shaped third portion 108. The first portion 104 comprises a radially inner first leg 110 and a radially outer second leg 112 which together define a first cavity 114. Similarly, the second portion 106 comprises a radially inner third leg 116 and a radially outer fourth leg 118 which together define a second cavity 120, and the third portion 108 comprises a radially inner fifth leg 122 and a radially outer sixth leg 124 which together define a third cavity 126. When the seal 102 is positioned in the annulus between the inner and outer tubular members 12, 14, the first leg 110 engages the inner tubular member and the sixth leg 124 engages the outer tubular member. As with the seal 20, the seal 102 may be installed as an interference fit between the inner and outer tubular members 12, 14 or mechanically energized into engagement with the inner and outer tubular members by a separate member.

In this embodiment of the invention, the first and second portions 104, 106 are oriented in opposite directions and the second and third portions 106, 108 are oriented in opposite directions. In this orientation, both the first and third cavities 114, 126 face the first part 16 of the annulus and the second cavity 120 faces the second part 18 of the annulus.

As with the seal assembly 10, the seal assembly 100 may comprise a number of optional support rings to help support the seal 102 within the annulus and to facilitate either the mechanical or pressure energization of the first and sixth legs 110, 124 into sealing engagement with the inner and outer tubular members 12, 14. For instance, a first support ring 128 may be positioned in the first cavity 114, a second support ring 130 may be positioned in the second cavity 120 and a third support ring 132 may be positioned in the third cavity 126.

In the embodiment of the invention shown in FIG. 6, the second support ring 130 is used to mechanically energize the first and sixth legs 110, 124 into sealing engagement with the inner and outer tubular members 12, 14. In this embodiment, the seal 102 is supported on a seat ring 134 which in turn is supported on one of the inner or outer tubular members 12, 14. Also, the second support ring 130 comprises a cross section which is configured to form an interference fit with the third cavity 120 when the seal 102 is in its relaxed or un-energized condition. Thus, when the second support ring 130 is forced down against the seal 102 by, e.g., an energizing mandrel 136, the third support ring 130 will enter the second cavity 120 and force the second leg 112 radially inwardly and the fifth leg 122 radially outwardly to thereby urge the first leg 110 into sealing engagement with the inner tubular member 12 and the sixth leg 124 into sealing engagement with the outer tubular member 14.

In this embodiment, the first and third support rings 128, 132 may be used to maintain the proper spacing between the first and second legs 110, 112 and between the fifth and sixth legs 122, 124, respectively. Alternatively, the first and third support rings 128, 132 may be used to mechanically energize the first and sixth legs 110, 124, in which event the first and third supports rings are configured to form an interference fit with their respective cavities 114, 126 and the second support ring 130 is optionally used to maintain the proper spacing between the second and fifth legs 112, 122. Alternatively, all three support rings may be used to mechanically energize the first and sixth legs 110, 124, in which event the support rings would be designed to form an interference fit with their respective cavities.

In an alternative embodiment of the invention, the first and sixth legs 110, 124 are pressure-energized into sealing engagement with the inner and outer tubular members 12, 14. In this example, pressure in the first part 16 of the annulus will urge the first and sixth legs 110, 124 into sealing engagement with the inner and outer tubular members 12, 14. Also, pressure in the second part 18 of the annulus will force the second leg 112 radially inwardly and the fifth leg 122 radially outwardly to thereby urge the first and sixth legs 110, 124 into sealing engagement with the inner and outer tubular members 12, 14.

Although not required, the first and third support rings 128, 132 may be used to facilitate the pressure energization of the first and sixth legs 110, 124. In this regard, pressure in the second part 18 of the annulus pushes radially outwardly on the first leg 110 and radially inwardly on the sixth leg 124. However, the first support ring 128 will cause the resultant forces acting on the first and second legs 110, 112 to cancel each other out. Similarly, the third support ring 132 will cause the resultant forces acting on the fifth and sixth legs 122, 124 to cancel each other out. As a result, the only forces acting on the first and sixth legs 110, 124 will be those resulting from the pressure acting on the third and fourth legs 116, 118, and these forces will urge the first and sixth legs into sealing engagement with the inner and outer tubular members 12, 14.

The second support ring 130 may also be used to facilitate the pressure energization of the first and sixth legs 110, 124. In this regard, the second support ring 130 may be positioned in the second cavity 120 to prevent pressure in the first part 16 of the annulus from pushing the third and fourth legs 116, 118 together and consequently pulling the first and sixth legs 110, 124 out of engagement with the inner and outer tubular members 12, 14. In this embodiment, the support rings 128, 130, 132 need not form an interference fit with their respective cavities 114, 120, 126.

Figure 8:
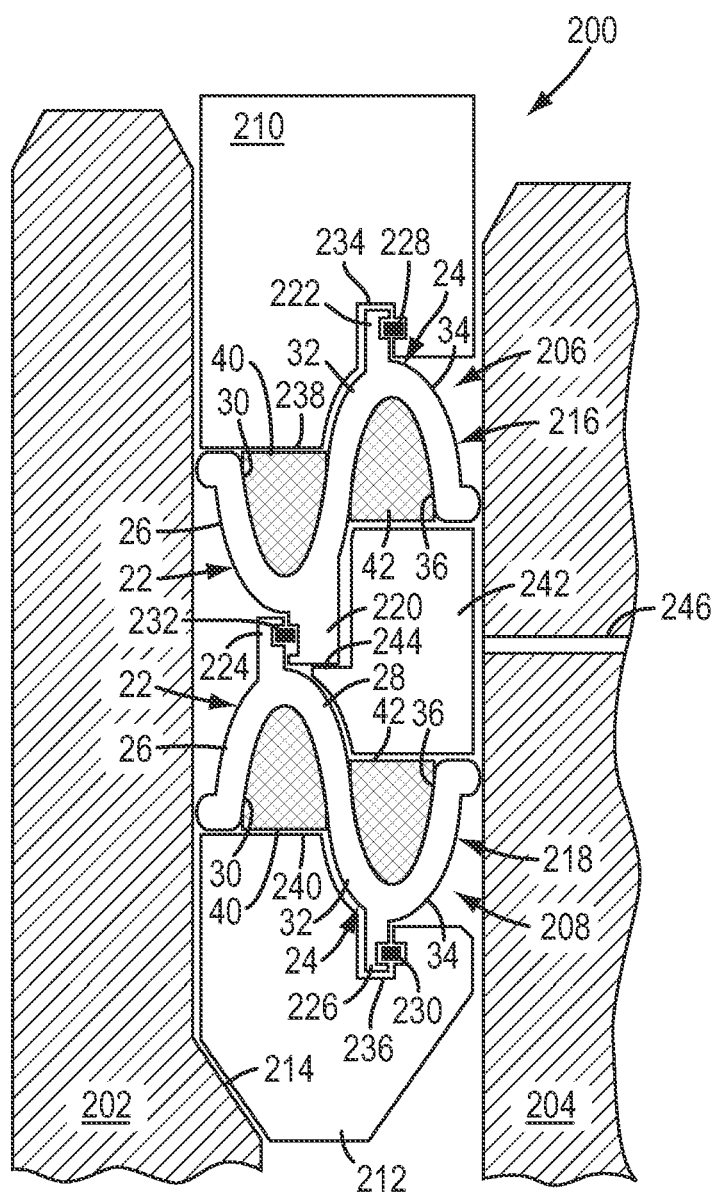
FIG. 8 is a cross sectional representation of an embodiment of the seal assembly of the present invention being used as an annulus packoff.

Another embodiment of the seal assembly of the present invention is shown in FIG. 8. The seal assembly of this embodiment is configured as a packoff, generally 200, which by way of example is shown installed in the annulus between a typical wellhead 204 and a representative tubular hanger 202, such as a tubing or casing hanger. The packoff 200 includes a pair of upper and lower seal assemblies 206, 208 which are positioned between an upper packoff body 210 and a lower packoff body 212, the latter of which is supported on an annular seat 214 that is formed on the outer diameter surface of the tubular hanger 202.

Each seal assembly 206, 208 is similar to the seal assembly 10 described above. Thus, each seal assembly 206, 208 includes an annular seal 216, 218 which comprises the general cross sectional configuration of the seal 20. Accordingly, the same reference numbers which were used to describe the seal 20 will be used to describe seals 216, 218.

When the packoff 200 is installed in the annulus between the wellhead 204 and the tubular hanger 202, the first legs 26 of the upper and lower seals 216, 218 will sealingly engage the tubular hanger and the fourth legs 34 of the upper and lower seals will sealingly engage the wellhead 204. In addition, the upper seal 216 is oriented such that the first cavity 30 between the first and second legs 26, 28 faces upward and the second cavity 36 between the third and fourth legs 32, 34 faces downward. Also, the lower seal 218 is oriented such that the first cavity 30 between the first and second legs 26, 28 faces downward and the second cavity 36 between the third and fourth legs 32, 34 faces upward.

The upper and lower seal assemblies 206, 208, the upper packoff body 210 and the lower packoff body 212 are preferably secured together by suitable means. In the embodiment of the invention shown in FIG. 8, for example, the upper seal 216 includes a first flange 220 which extends downwardly from the apex of the first generally U-shaped portion 22 and a second flange 222 which extends upwardly from the apex of the second generally U-shaped portion 24. Similarly, the lower seal 218 includes a third flange 224 which extends upwardly from the first U-shaped portion 22 and a fourth flange 226 which extends downwardly from the apex of the second U-shaped portion 24. The second flange 222 is connected to the upper packoff body 210 by a first retainer strip 228, the fourth flange 226 is connected to the lower packoff body 212 by a second retainer strip 230, and the first and third flanges 220, 224 are connected together by a third retainer strip 232.

The upper and lower packoff bodies 210, 212 may be recessed respectively at 234 and 236 to accommodate the flanges 222 and 226, and the flanges and the packoff bodies are mutually grooved to accommodate the retainer strips 228, 230, 232. In addition, the groove in one of the flanges 220, 224 is ideally elongated in the axial direction to allow the upper and lower seals 216 and 218 to displace toward each other during setting of the packoff 200.

Each of the upper and lower seal assemblies 206, 208 may also include first and second support rings 40, 42 which are positioned in the first and second cavities 30, 36, respectively. In this regard, the upper packoff body 210 ideally includes a lower shoulder portion 238 which engages the first support ring 40 of the upper seal assembly 206, and the lower packoff body 212 ideally includes an upper seat portion 240 which engages the first support ring 40 of the lower seal assembly 208. In addition, the packoff 200 preferably includes a spacer ring 242 which is positioned between the second support ring 42 of the upper seal assembly 206 and the second support ring 42 of the lower seal assembly 208. The spacer ring 242 may include an annular lip 244 which is engaged by the bottom of the first flange 220 of the upper seal assembly 206 during setting of the packoff 200.

In use, the packoff 200 is installed using an appropriate tool and is locked into place in the annulus using a convention lockdown mechanism connected to the upper packoff body 210. Once installed and optionally energized, the seal assemblies 206, 208 will function in a manner similar to the seal assembly 10 to provide a bi-directional seal against pressure acting from above the packoff 200 and pressure acting from below the packoff. In addition, the seal assemblies 206, 208 will contain the pressure introduced through a test port 246 in the wellhead 204 during pressure testing of the packoff 200.

Figure 9:
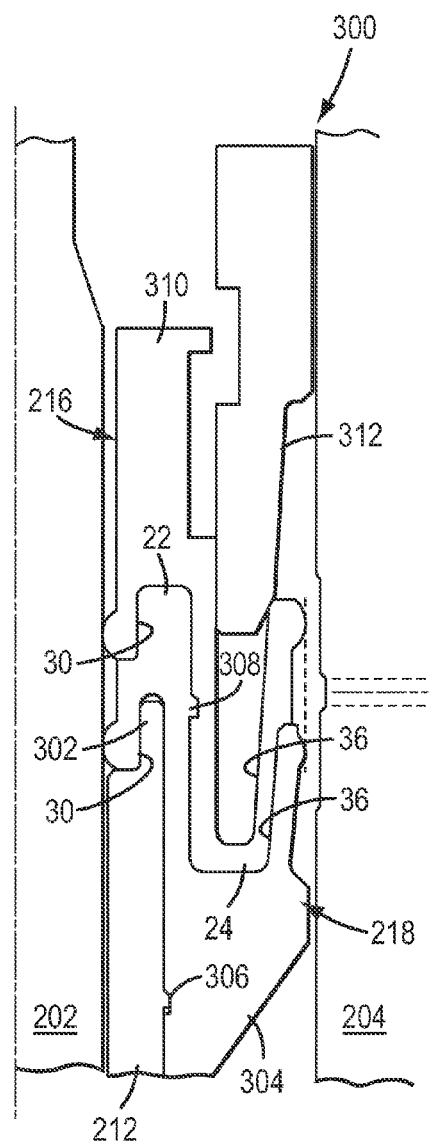
FIG. 9 is a cross sectional representation of a second embodiment of the seal assembly of the present invention shown being used as an annulus packoff.

A second embodiment of a packoff which is based on the seal assembly of the present invention is shown in FIG. 9. The packoff of this embodiment, generally 300, includes an upper annular seal 216 which is nested within a lower annular seal 218. In other words, the first portion 22 of the lower seal 218 is positioned at least partially within the first cavity 30 of the upper seal 216 and the second portion 24 of the upper seal is positioned at least partially within the second cavity 36 of the lower seal. In addition, the first portion 22 of the lower seal 218 is preferably configured to form a sliding fit with the first cavity 30 of the upper seal 216, and the second portion 24 of the upper seal is preferably configured to form a sliding fit with the second cavity 36 of the lower seal.

The lower seal 218 is supported on a rawer packoff body or seat ring 212 which in turn is supported on the tubular hanger 202. The seat ring 212 includes an upper flange 302 which is preferably configured to form a sliding fit with the first cavity 30 of the lower seal. The lower seal 218 includes an integral support ring 304 which is connected to the seat ring 212 through a cam and groove arrangement 306. In addition, the upper seal 216 is connected to the lower seal 218 through a cam and groove arrangement 308.

During installation of the packoff 300, the seat ring 212 and the upper and lower seals 216, 218 are assembled and lowered as a unit into the annulus between the tubular hanger 202 and the wellhead 204. This action may be facilitated by the use of a suitable tool (not shown) which engages a setting mandrel 310 that is connected to or formed integrally with the upper seal 216. An upper packoff body or energizing mandrel 312 which is configured to form an interference fit with the second cavity 36 of the upper seal 216 is then forced down into the second cavity. This action forces the first legs 26 of the first and second seals 216, 218 into sealing engagement with the tubular hanger 202 and the fourth legs 34 of the first and second seals into sealing engagement with the wellhead 204 to thereby seal the annulus.

Figure 10:
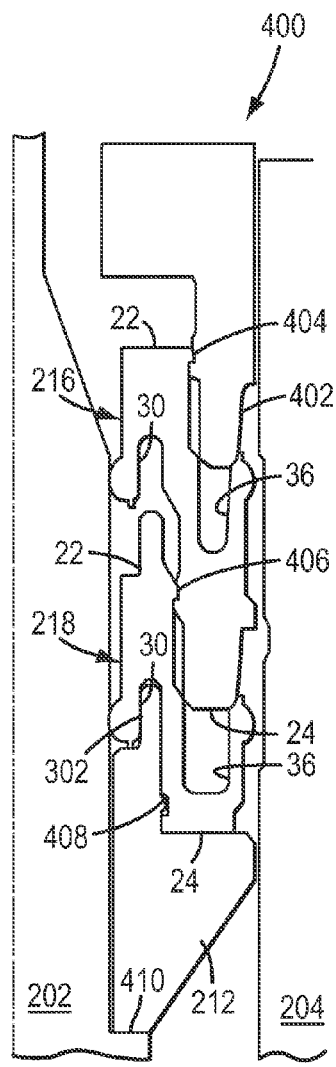
FIG. 10 is a cross sectional representation of a third embodiment of the seal assembly of the present invention shown being used as an annulus packoff.

Another embodiment of a packoff which is based on the seal assembly of the present invention is shown in FIG. 10. The packoff of this embodiment, generally 400, is similar to the packoff 300 described above. In this embodiment, however, the first portion 22 of the lower seal 218 is preferably configured to form an interference fit with the first cavity 30 of the upper seal 216, and the second portion 24 of the upper seal is preferably configured to form an interference fit with the second cavity 36 of the lower seal. In addition, the upper seal 216 is connected to an upper packoff body or energizing mandrel 402 through a cam and groove arrangement 404 and to the lower seal 218 through a cam and groove arrangement 406. The lower seal 218 in turn is connected to a lower packoff body or seat ring 212 through a cam and groove arrangement 408.

During installation of the packoff 400, the assembly of the seat ring 212, the lower seal 218, the upper seal 216 and the energizing mandrel 402 is lowered into the annulus between the tubular hanger 202 and the wellhead 204 until the seat ring comes to rest on a seat 410 which is formed on the outer surface of the tubular hanger. The energizing mandrel 402 is then forced down against the upper seal 216. This action forces the second portion 24 of the upper seal 216 into the second cavity 36 of the lower seal 218, which in turn forces the first and fourth legs 26, 34 of the lower seal into sealing engagement with the tubular hanger 202 and the wellhead 204, respectively. Further downward movement of the energizing mandrel 402 forces the energizing mandrel into the second cavity 36 of the upper seal 216, which in turn forces the first and fourth legs of the upper seal into sealing engagement with the tubular hanger 202 and the wellhead 204, respectively.

Figure 11:
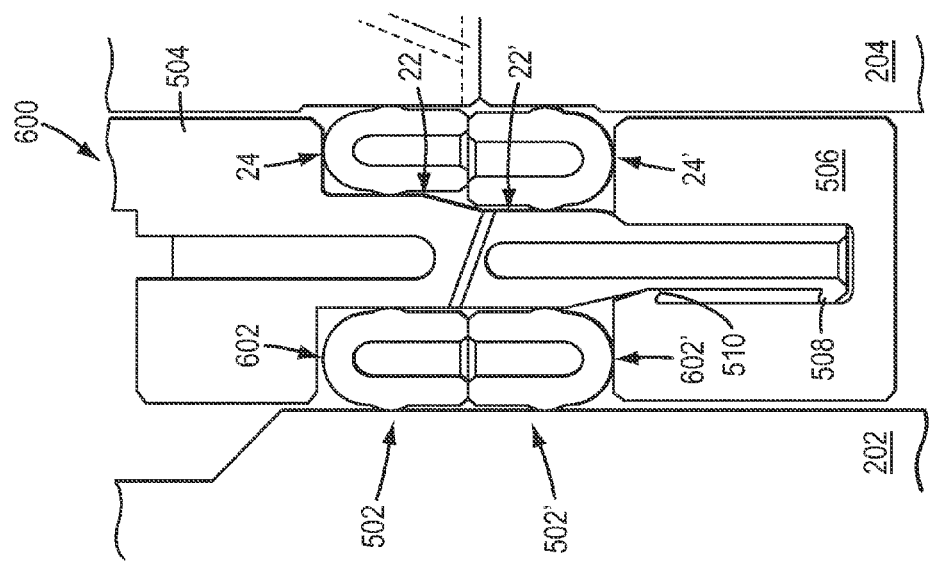
FIG. 11 is a cross sectional representation of a fourth embodiment of the seal assembly of the present invention shown being used as an annulus packoff.

Yet another embodiment of a packoff which incorporates the seal assembly of the present invention is shown in FIG. 11. The packoff of this embodiment, generally 500, illustrates a particular feature of the present invention, namely, that the first and second generally U-shaped portions of the annular seal do not need to be formed integrally or connected together.

As shown in FIG. 11, the packoff 500 includes an upper seal 502 and a lower seal 502'. The upper seal 502 includes a radially inner, generally U-shaped first portion 22 and a radially outer, generally U-shaped second portion 24. The first portion 22 comprises part of an upper packoff body or energizing mandrel 504 while the second portion 24 comprises a distinct seal ring. As in the previous embodiments, the first portion 22 includes a radially inner first leg 26 and a radially outer second leg 28 which together define a first cavity 30, and the second portion 24 comprises a radially inner third leg 32 and a radially outer fourth leg 34 which together define a second cavity 36. However, the second and third legs 28, 32 are not joined together. Rather, the second and third legs 28, 32 are positioned side by side and are sealed against each other at a point which is located radially between the first and fourth legs 26, 34.

The second portion 24 is ideally configured to form an interference fit between the first portion 22 and the wellhead 204 after the packoff 500 is set. In addition, the second portion 24 may comprise radially inner and outer seal bumps 48, 50 which are formed on the third and fourth legs 32, 34, respectively. Thus, after the packoff 500 is set the second and third legs 28, 32 will be sealed against each other at the inner seal bump 48.

Similar to the upper seal 502, the lower seal 502' includes a radially inner, generally U-shaped first portion 22' and a radially outer, generally U-shaped second portion 24'. The first portion 22' comprises a part of the upper packoff body 504 located below the first portion 22, while the second portion 24' comprises a distinct seal ring. The first portion 22' includes a radially inner first leg 26' and a radially outer second leg 28' which together define a first cavity 30', and the second portion 24' comprises a radially inner third leg 32' and a radially outer fourth leg 34' which together define a second cavity 36'. The second and third legs 28', 32' are positioned side by side and are sealed against each other at a point which is located radially between the first and fourth legs 26', 34'.

As with the second portion 24 of the upper seal 502, the second portion 24' of the lower seal 502' is ideally configured to form an interference fit between the first portion 22' and the wellhead 204 after the packoff 500 is set. In addition, the second portion 22' may comprise radially inner and outer seal bumps 48', 50' which are formed on the third and fourth legs 32', 34', respectively. In this manner, after the packoff 500 is set the second and third legs 28', 32' will be sealed against each other at the inner seal bump 48'.

The lower seal 502' is supported on a lower packoff body or seat ring 506 which in turn is supported on the tubular hanger 202 or the wellhead 204. Furthermore, the upper packoff body 504 includes an annular hook ring 508 which depends downwardly from the second leg 28' of the lower seal 502' and which, prior to installation of the packoff 500, engages a stop ring 510 on the lower packoff body 506 to thereby link the upper packoff body to the lower packoff body.

During installation of the packoff 500, the assembly of the upper packoff body 504, the upper and lower seals 502, 502' and the lower packoff body 506 is lowered and landed in the annulus between the tubular hanger 202 and the wellhead 204. The upper packoff body 504 is then forced downward until it lands on the second portion 24 of the upper packoff body. This action energizes the packoff 500 into sealing engagement with the tubular hanger 202 and the wellhead 204. In particular, as the first portion 22 of the upper seal 502 moves to a position adjacent the second portion 24 of the upper seal, the first leg 26 is urged into sealing engagement with the tubular hanger 202, the fourth leg 34 is urged into sealing engagement with the wellhead 204 and the second and third legs 28, 32 are urged into sealing engagement against each other. Similarly, as the as the first portion 22' of the lower seal 502' moves to a position adjacent the second portion 24' of the lower seal, the first leg 26' is urged into sealing engagement with the tubular hanger 202, the fourth leg 34' is urged into sealing engagement with the wellhead 204 and the second and third legs 28', 32' are urged into sealing engagement against each other.

Figure 12:
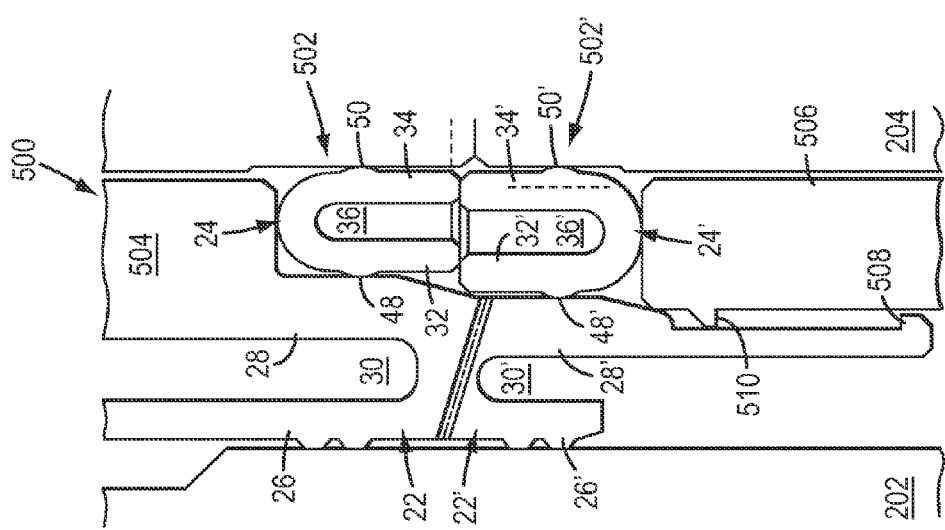
FIG. 12 is a cross sectional representation of a fifth embodiment of the seal assembly of the present invention shown being used as an annulus packoff.

Another embodiment of a packoff which incorporates the seal assembly of the present invention is shown in FIG. 12. The packoff of this embodiment, generally 600, is similar to the packoff 500 described above. However, in the packoff 600 the upper seal 502 comprises a third generally U-shaped portion 602 which is located radially inwardly of the first portion 22 and the lower seal 502' comprises a third generally U-shaped portion 602' which is located radially inwardly of the first portion 22'. As with the packoff 500, the third portions 602, 602' comprise distinct seal rings.

The third portion 602 of the upper seal 502 forms an interference fit between the first portion 22 and the tubular hanger 202 when the packoff 600 is set. Similarly, the third portion 602' of the lower seal 502' forms an interference fit between the first portion 22' and the tubular hanger 202 when the packoff 600 is set. Thus, when the upper packoff body or energizing mandrel 502 is moved downward toward the lower packoff body or seat 506, the upper and lower seals 502, 502' will be energized into sealing engagement with the tubular hanger 202 and the wellhead 204.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:
1. A seal assembly for sealing an annulus between concentric inner and outer tubular members, the seal assembly comprising:
   an annular first seal which is positioned between the inner and outer tubular members to thereby divide the annulus into axially spaced first and second parts, the first seal in cross section comprising:
      a generally U-shaped first seal portion which comprises a radially inner first leg, a radially outer second leg, and a first cavity that is located between the first and second legs, the first leg being configured to sealingly engage the inner tubular member;
      a generally U-shaped second seal portion which is located radially outwardly of the first seal portion and which comprises a radially inner third leg, a radially outer fourth leg, and a second cavity that is located between the third and fourth legs, the fourth leg being configured to sealingly engage the outer tubular member;
      wherein the first and second seal portions are oriented generally parallel to an axial centerline of the tubular members and the second and third legs are joined at a position located radially between the first and fourth legs such that the first cavity faces the first part of the annulus and the second cavity faces the second part of the annulus, the second and third legs being joined such that movement of the second leg radially outwardly forces the third leg radially outwardly and movement of the third leg radially inwardly forces the second leg radially inwardly;
   a first support ring which is positioned in the first cavity and is configured to maintain a minimum radial distance between the first and second legs; and
   a second support ring which is positioned in the second cavity and is configured to maintain a minimum radial distance between the third and fourth legs;

wherein the seal assembly is configured such that a pressure in the first part of the annulus greater than a pressure in the second part of the annulus forces the first and second legs radially apart, while the second support ring maintains the minimum radial distance between the third and fourth legs, to thereby maintain the first leg in sealing engagement with the inner tubular member and the fourth leg in sealing engagement with the outer tubular member; and wherein the seal assembly is configured such that a pressure in the second part of the annulus greater than a pressure in the first part of the annulus forces the third and fourth legs radially apart, while the first support ring maintains the minimum radial distance between the first and second legs, to thereby maintain the first leg in sealing engagement with the inner tubular member and the fourth leg in sealing engagement with the outer tubular member;

whereby the first and fourth legs maintain sealing engagement with the inner and outer tubular members, respectively, whether the pressure in the first part of the annulus is greater than the pressure in the second part of the annulus or the pressure in the second part of the annulus is greater than the pressure in the first part of the annulus.

2. The seal assembly of claim 1, wherein the first leg sealingly engages the inner tubular member through at least a first sealing bump which is formed on a radially inner surface of the first leg and the fourth leg sealingly engages the outer tubular member through at least a second sealing bump which is formed on a radially outer surface of the fourth leg.

3. The seal assembly of claim 2, wherein the first and second sealing bumps are located approximately in a first plane which is perpendicular to the axial centerline of the inner and outer tubular members, the first cavity comprises an axially inner end which is located approximately in a second plane that is parallel to the first plane and is spaced apart from the first plane in a direction toward the second part of the annulus, and the second cavity comprises an axially inner end which is located approximately in a third plane that is parallel to the first plane and is spaced apart from the first plane in a direction toward the first part of the annulus.

4. The seal assembly of claim 1, wherein the first leg comprises a radially outer surface which defines a radially inner side of the first cavity, the fourth leg comprises a radially inner surface which defines a radially outer side of the second cavity, the first support ring comprises a first portion which conforms to substantially the entire radially outer surface of the first leg, and the second support ring comprises a first portion which conforms to substantially the entire radially inner surface of the fourth leg.

5. The seal assembly of claim 4, wherein the second leg comprises a radially inner surface which defines a radially outer side of the first cavity, the third leg comprises a radially outer surface which defines a radially inner side of the second cavity, the first support ring comprises a second portion which conforms to substantially the entire radially inner surface of the second leg, and the second support ring comprises a second portion which conforms to substantially the entire radially outer surface of the third leg.

6. The seal assembly of claim 1, further comprising first and second packoff members between which the first seal is positioned, the first packoff member being supported on at least one of the inner and outer tubular members and the second packoff member being movable toward the first packoff member to thereby cause the first and second support rings to mechanically energize the first and fourth legs into sealing engagement with the inner and outer tubular members, respectively.

7. The seal assembly of claim 6, wherein the first support ring is formed integrally with the first packoff member.

8. The seal assembly of claim 7, wherein the second support ring is formed integrally with the second packoff member.

9. The seal assembly of claim 1, further comprising:
an annular second seal which is positioned in the annulus axially adjacent the first seal, the second seal in cross section comprising:
a generally U-shaped third seal portion which comprises a radially inner fifth leg, a radially outer sixth leg, and a third cavity that is located between the fifth and sixth legs, the fifth leg being configured to sealingly engage the inner tubular member;
a generally U-shaped fourth seal portion which is located radially outwardly of the third seal portion and which comprises a radially inner seventh leg, a radially outer eighth leg, and a fourth cavity that is located between the seventh and eighth legs, the eighth leg being configured to sealingly engage the outer tubular member;
wherein the third and fourth seal portions are oriented generally parallel to the axial centerline of the tubular members and the sixth and seventh legs are joined at a position located radially between the fifth and eighth legs such that the third cavity faces the first part of the annulus and the fourth cavity faces the second part of the annulus, the sixth and seventh legs being joined such that movement of the sixth leg radially outwardly forces the seventh leg radially outwardly and movement of the seventh leg radially inwardly forces the sixth leg radially inwardly;
a third support ring which is positioned in the third cavity and is configured to maintain a minimum radial distance between the fifth and sixth legs; and
a fourth support ring which is positioned in the fourth cavity and is configured to maintain a minimum radial distance between the seventh and eighth legs.

10. The seal assembly of claim 9, further comprising first and second packoff members between which the first and second seals are positioned, the first packoff member being supported on at least one of the inner and outer tubular members and the second packoff member being movable toward said first packoff member to thereby cause the first and second support rings to mechanically energize the first and fourth legs into sealing engagement with the inner and outer tubular members, respectively, and the third and fourth support rings to mechanically energize the fifth and eighth legs into sealing engagement with the inner and outer tubular members, respectively.

11. The seal assembly of claim 10, wherein the first support ring is formed integrally with the first packoff member and the fourth support ring is formed integrally with the second packoff member.

12. The seal assembly of claim 11, wherein the second support ring is formed integrally with the fourth seal portion and the third support ring is formed integrally with the first seal portion.

13. A seal assembly for sealing an annulus between concentric inner and outer tubular members, the seal assembly comprising an annular first seal which is positioned between the inner and outer tubular members to thereby divide the annulus into axially spaced first and second parts, the first seal in cross section comprising:
a generally U-shaped first seal portion which includes a radially inner first leg, a radially outer second leg, and a first cavity that is located between the first and second legs, the first leg comprising a first sealing bump which is configured to sealingly engage the inner tubular member;
a generally U-shaped second seal portion which is located radially outwardly of the first seal portion and which includes a radially inner third leg, a radially outer fourth leg, and a second cavity which is located between the third and fourth legs, the fourth leg comprising a second sealing bump which is configured to sealingly engage the outer tubular member;
wherein the first and second seal portions are oriented generally parallel to an axial centerline of the tubular members and the second and third legs are joined at a position located radially between the first and fourth legs such that the first cavity faces the first part of the annulus and the second cavity faces the second part of the annulus, the second and third legs being joined such that movement of the second leg radially outwardly forces the third leg radially outwardly and movement of the third leg radially inwardly forces the second leg radially inwardly;
wherein the first and second sealing bumps are located approximately in a first plane which is perpendicular to the axial centerline of the inner and outer tubular members, the first cavity comprises an axially inner end which is located approximately in a second plane that is parallel to the first plane and is spaced apart from the first plane in a direction toward the second part of the annulus, and the second cavity comprises an axially inner end which is located approximately in a third plane that is spaced apart from the first plane in a direction toward the first part of the annulus.

14. The seal assembly of claim 13, wherein a radially inner surface of the first leg and a radially outer surface of the fourth leg extend generally parallel to the axial centerline of the inner and outer tubular members.

15. The seal assembly of claim 14 wherein the first seal portion comprises a generally flat first apex which extends generally perpendicularly between the radially inner surface of the first leg and a radially outer surface of the second leg, and wherein the second seal portion comprises a generally flat second apex which extends generally perpendicularly between the radially outer surface of the fourth leg and a radially inner surface of the third leg.

16. A seal assembly for sealing an annulus between concentric inner and outer tubular members, the seal assembly comprising:
an annular first seal which is positioned in the annulus to thereby divide the annulus into axially spaced first and second parts, the first seal in cross section comprising:
a generally U-shaped first seal portion which comprises a radially inner first leg, a radially outer second leg, and a first cavity that is located between the first and second legs, the first leg being configured to sealingly engage the inner tubular member;
a generally U-shaped second seal portion which is located radially outwardly of the first portion and which comprises a radially inner third leg, a radially outer fourth leg, and a second cavity that is located between the third and fourth legs, the fourth leg being configured to sealingly engage the outer tubular member;
wherein the first and second seal portions are separate members and the second and third legs are sealingly engaged with each other such that the first cavity faces the first part of the annulus and the second cavity faces the second part of the annulus, the second and third legs being configured such that that movement of the second leg radially outwardly forces the third leg radially outwardly and movement of the third leg radially inwardly forces the second leg radially inwardly;
wherein a pressure in the first part of the annulus greater than a pressure in the second part of the annulus forces the first and second legs radially apart to thereby maintain the first leg in sealing engagement with the inner tubular member and the fourth leg in sealing engagement with the outer tubular member; and
wherein a pressure in the second part of the annulus greater than a pressure in the first part of the annulus forces the third and fourth legs radially apart to thereby maintain the first leg in sealing engagement with the inner tubular member and the fourth leg in sealing engagement with the outer tubular member;
whereby the first and fourth legs maintain sealing engagement with the inner and outer tubular members, respectively, whether the pressure in the first part of the annulus is greater than the pressure in the second part of the annulus or the pressure in the second part of the annulus is greater than the pressure in the first part of the annulus.

17. The seal assembly of claim 16, wherein the first leg sealingly engages the inner tubular member through at least a first sealing bump which is formed on a radially inner surface of the first leg and the fourth leg sealingly engages the outer tubular member through at least a second sealing bump which is formed on a radially outer surface of the fourth leg.

18. The seal assembly of claim 17, wherein the first and second sealing bumps are located approximately in a first plane which is perpendicular to the axial centerline of the inner and outer tubular members, the first cavity comprises an axially inner end which is located approximately in a second plane that is parallel to the first plane and is spaced apart from the first plane in a direction toward the second part of the annulus, and the second cavity comprises an axially inner end which is located approximately in a third plane that is parallel to the first plane and is spaced apart from the first plane in a direction toward the first part of the annulus.

19. The seal assembly of claim 16, further comprising first and second packoff members between which the first seal is positioned, the first packoff member being supported on at least one of the inner and outer tubular members and the second packoff member being movable toward the first packoff member to thereby mechanically energize the first and fourth legs into sealing engagement with the inner and outer tubular members, respectively.

20. The seal assembly of claim 19, wherein the first seal portion is formed integrally with the second packoff member.

* * * * *